United States Patent [19]

Tucker et al.

[11] Patent Number: 4,929,423

[45] Date of Patent: May 29, 1990

[54] LOW TOXICITY ALLOY COMPOSITIONS FOR JOINING AND SEALING

[75] Inventors: Kay L. Tucker, Pinner; Ulysses Ma, London, both of England

[73] Assignee: Cookson Group plc, London, United Kingdom

[21] Appl. No.: 331,189

[22] Filed: Mar. 31, 1989

[30] Foreign Application Priority Data

Mar. 31, 1988 [GB] United Kingdom ............... 8807730

[51] Int. Cl.$^5$ ............................................. C22C 13/02
[52] U.S. Cl. ..................................... 420/561; 144/25; 228/263.11
[58] Field of Search ........................ 420/561; 148/25; 428/606; 228/263.11

[56] References Cited

U.S. PATENT DOCUMENTS

| 736,712 | 8/1903 | Fortun et al. | 420/561 |
| 1,483,327 | 2/1924 | Bolus | 420/559 |
| 4,695,428 | 9/1987 | Ballentine et al. | 420/561 |
| 4,758,407 | 7/1988 | Ballentine et al. | 420/561 |
| 4,806,309 | 2/1989 | Tulman | 420/561 |

FOREIGN PATENT DOCUMENTS

| 61-273296 | 12/1986 | Japan | 420/559 |
| 62-72496 | 4/1987 | Japan | 420/559 |
| 131299 | 8/1919 | United Kingdom . | |

Primary Examiner—Robert McDowell
Attorney, Agent, or Firm—Watson, Cole, Grindle & Watson

[57] ABSTRACT

A lead-free alloy for joining and sealing which is useful as a plumbing solder comprises from 0.08 to 20% by weight of bismuth, from 0.02 to 1.5% by weight of copper, from 0.01 to 1.5% by weight of silver, from 0 to 0.10 percent by weight of phosphorus, from 0 to 0.20% of a rare earth mixture and the balance tin, together with incidental impurities. The alloy has a similar pasty range (i.e. melting temperature and melting range) to the traditional tin-lead plumbing solders.

11 Claims, No Drawings

LOW TOXICITY ALLOY COMPOSITIONS FOR JOINING AND SEALING

The present invention relates to low toxicity alloy compositions for joining and sealing and, in particular, to a lead-free alloy which is useful as a plumbing solder.

Traditional plumbing solders comprise lead and tin either in an equal ratio or in a ratio of 70% Sn:30% Pb. These solders weld copper piping very well, can be used over a wide range of temperatures, and form strong mechanical joints. However, governments have recently begun to restrict the use of lead in plumbing solders for public supply systems carrying drinking water because of the fear that small amounts of lead dissolved in water and ingested over a long period of time may be detrimental to health. The first response to these restrictions was the introduction of a 95% Sn:5% Sb alloy, but more recently fears have developed in respect of the toxicity of antimony.

A particular low toxicity corrosion resistant soldering composition is described in EP-0251611. This composition comprises from 91 to 99.25% tin by weight, from 0.7 to 6% copper by weight and from 0.05 to 3% silver by weight, the composition being essentially free of lead, antimony, arsenic, cobalt, bismuth, thallium, cadmium, mercury and gallium.

We have now developed an alloy composition for joining and sealing which is based upon tin, bismuth, silver and copper and which has a similar pasty range (i.e. melting temperature and melting range) to the traditional tin-lead plumbing solders.

Accordingly, the present invention provides a low toxicity alloy composition for joining and sealing comprising from 0.08 to 20% by weight of bismuth, from 0.02 to 1.5% by weight of copper, from 0.01 to 1.5% by weight of silver, from 0 to 0.10 percent by weight of phosphorus, from 0 to 0.20% of a rare earth mixture (as hereinafter defined) and the balance tin, together with incidental impurities.

The alloy compositions of the invention preferably comprise from 0.05 to 8% by weight of bismuth, more preferably 3 to 6% by weight of bismuth; from 0.1 to 0.7% by weight of copper; and from 0.05 to 5% by weight of silver, preferably 0.1 to 0.4% by weight of silver. This alloy has a wide range of workability and thus can be readily used as a solder by plumbers who are well acquainted with the use of tin/lead solders.

It is to be understood that the alloy compositions of the present invention may include incidental impurities therein, such as zinc and gold in an amount of up to 0.001% by weight, antimony, indium and boron in an amount of up to 0.01% by weight, and cobalt in an amount of up to 0.15% by weight.

The rare earth mixture is defined herein as a mixture of 53% cerium, 24% lanthanum, 16% neodynium, 5% praseodymium and impurities, all percentages being by weight.

The alloy compositions of the invention may be prepared according to techniques known in the art, for example by melting the tin base element, raising the temperature of the molten tin to a temperature of about 450° C. and adding the remaining ingredients thereto with thorough mixing to ensure complete dissolution thereof. A flux will then generally be added in order to remove oxides from the surface thereof.

The alloy compositions of the present invention are preferably used as solders and in particular are effective for use as plumbing solders. They may also be used for joining cans, sealing vacuum flasks and for any other uses where two metal surfaces have to be joined together. For example, the alloy compositions may be used to join together stainless steel or galvanized steel surfaces, or aluminium in the presence of a suitable flux.

The alloy compositions of the present invention may be formed into wires, rods, coils or other shaped bodies which may be stored conveniently until they are required for use. Particular shaped bodies into which the alloy compositions may be formed are preforms. These are small bodies of the alloy which are shaped closely to match a shape which is commonly joined, such as a ring or annular plate. When the alloy is intended for use as a solder then in some instances a solder flux may also be required at the time when the solder is to be used and it may be convenient, in such cases, to form the shaped body with a hollow core containing the solder flux, e.g., a wire having a hollow core filled with the solder flux.

The alloy compositions of the present invention may also be used as pastes or creams in which particles of the alloy are dispersed, optionally together with a flux, in a viscous carrier. The carriers should have a high viscosity so that they are able to maintain the other components of the paste or cream in suspension.

The present invention also includes within its scope a method of joining metals using an alloy composition of the present invention, which method comprises heating the metals above the melting temperature of the alloy composition while holding the metals adjacent to each other and contacting the composition with at least one of the metals to be joined.

One particular indication of the ease with which a solder may be used is the melting range, i.e., the difference between the liquidus and solidus temperatures, as this indicates the range of temperatures over which the solder may be used. Throughout much of this range the solders of the invention form a paste having neither the flowability of a liquid nor the rigidity of a solid. The alloys of the present invention have a true pasty region and this makes them particularly suitable for use as plumbing solders. They also can be formed satisfactorily, have good mechanical strength, flow characteristics and corrosion properties.

The present invention will be further described with reference to the following Example.

EXAMPLE 1

A solder alloy was prepared by heating the base element tin in a Pyrex beaker maintained at a temperature of 300° C. The temperature was then raised to 450° C. and the remaining ingredients added. The alloy was then thoroughly mixed to ensure complete dissolution/melting. After this was achieved flux was added to remove oxides from the surface thereof. The alloy was then cast into a preheated graphite stick mould and allowed to air-cool.

The following compositions were prepared according to this method and to illustrate the melting range of the solder, the actual solidus and liquidus temperatures are given:

TABLE 1

| Solder | (Wt. %) | | | | | Solidus (°C.) | Liquidus (°C.) |
| --- | --- | --- | --- | --- | --- | --- | --- |
| | Sn | Bi | Cu | Ag | Pb | | |
| 1 | 91.4 | 8.0 | 0.2 | 0.4 | — | 187 | 223 |
| 2 | 88.5 | 10.7 | 0.45 | 0.35 | — | 216 | 240 |
| 3 | 95.8 | 3.8 | 0.2 | 0.2 | — | 206 | 234 |

TABLE 1-continued

| Solder | Sn | Bi | Cu | Ag | Pb | Solidus (°C.) | Liquidus (°C.) |
|---|---|---|---|---|---|---|---|
| 4 | 93.4 | 6.0 | 0.2 | 0.4 | — | 198 | 231 |
| 5 | 70 | — | — | — | 30 | 183 | 270 |
| 6 | 50 | — | — | — | 50 | 183 | 194 |
| 7 | 95.6 | 3.8 | 0.2 | 0.38 | — | 193 | 238 |
| 8 | 88.7 | 10.8 | 0.2 | 0.37 | — | 204 | 226 |

(Examples 5 and 6 are Comparative Examples.)

These compositions were all extruded to form wires using a hydraulic press and a 2.85 diameter die and can eaily be formed into coils. All of compositions 1 to 4 were more difficult to extrude than the conventional tin/lead solders 5 and 6.

Solder 3 had a mechanical strength, at temperatures in the range of from 0° to 60° C., midway between the mechanical strengths of the solders 5 and 6.

Solders 3 and 4 have better corrosion potentials and currents than the solders 5 and 6 at temperatures of from ambient to 60° C.

All of the solders of the invention detailed in Table 1 were used by professional plumbers who found good wetting and flow properties.

Solder 3 had the following properties:

| Ring/Plug Shear Tests Strain Rate 5 mm/min | | | |
|---|---|---|---|
| | Room Temperature | 2° C. | 60° C. |
| Modulus N/mm² | 8.13 | 7.80 | 13.01 |
| Shear Stress N/mm² | 50.69 | 51.29 | 37.33 |

| | Tensile Strength (kPa) | Elongation (%) |
|---|---|---|
| Room Temperature | 65,550 | 30 |
| 10° C. | 81,075 | 32 |
| 60° C. | 40,020 | 32 |

Room temperature pipe burst pressure test were also performed. The average pressure to failure was 27,048 kPa, with the failure being a split tube and not a soldered joint.
Pasty range: 28° C.
Surface tension: $504 \pm 5\%$ dyne cm$^{-1}$ at $205 \pm 10°$ C.
Viscosity: at 230° C.=2.93 mPa s and at 260° C.=1.48 mPa s.
Latent heat of fusion: 55.2 Joule/gram
Coefficient of thermal expansion: $25 \times 10^{-6}$ per degree C. from 20° to 130° C.

EXAMPLE 2

The following solder containing the optional ingredient phosphorus was prepared according to the method of Example 1.

TABLE 2

| Solder | Sn | Bi | Cu | Ag | P | Solidus (°C.) | Liquidus (°C.) |
|---|---|---|---|---|---|---|---|
| 9 | 95.8 | 3.8 | 0.2 | 0.2 | 0.01 | 227 | 246 |

EXAMPLE 3

The corrosion properties of the solder No. 3 of Example 1 were tested at 25° C. against a conventional tin/lead solder alloy and a solder having the composition 4.5% Cu, 0.5% Ag balance Sn.

The corrosion data were measured by varying the open circuit resistance between the solder sample and copper in the range 900K ohm to 100 ohm and recording current and surface potentials. Plots of current versus potential produced Evans diagrams from which corrosion potentials and currents could be estimated. Values for the average corrosion current ($I_{corr}$) and average corrosion potential ($V_{corr}$) are given in the following Table:

| Alloy | $V_{corr}$ (m volts) | $I_{corr}$ (μA) |
|---|---|---|
| Cu—Sn—Ag | 75 | 19.3 |
| Example 3 | 38 | 9.9 |
| 50/50 Pb/Sn | 22 | 4.1 |

It can be seen that the alloy of the invention performed better in these corrosion tests than the other lead-free solder alloy, but did not perform as well as the lead/tin alloy.

We claim:
1. A low toxicity alloy composition for joining and sealing consisting essentially of from 0.08 to 20% by weight of bismuth, from 0.02 to 1.5% by weight of copper, from 0.01 to 1.5% by weight of silver, from 0 to 0.10% by weight of phosphorus, from 0 to 0.02% by weight of a rare earth mixture consisting of a mixture of 53% cerium, 24% lanthanum, 16% neodymium and 5% praesedymium, no more than 0.01% by weight antimony and the balance tin, together with incidental impurities.
2. Alloy composition according to claim 1 which contains from 0.08 to 8% by weight of bismuth.
3. Alloy composition according to claim 1 which contains from 3 to 6% by weight of bismuth.
4. Alloy composition according to claim 1 which contains from 0.1 to 0.7% by weight of copper.
5. Alloy composition according to claim 1 which contains from 0.05 to 0.5% by weight of silver.
6. Alloy composition according to claim 1 which contains from 0.1 to 0.4% by weight of silver.
7. A wire, coil, rod or preform which consists essentially of said low toxicity alloy composition according to claim 1.
8. A wire, coil, rod or preform according to claim 7 which contains a hollow core in which an alloy flux is disposed.
9. A paste which comprises particles of said alloy composition according to claim 1 dispersed in a viscous carrier.
10. Alloy composition according to claim 1 which is lead free.
11. A lead-free plumbing solder which consists essentially of 0.08 to 20% by weight bismuth, 0.02 to 1.5% by weight copper, 0.01 to 1.5% silver, no more than 0.01% by weight antimony and a balance of tin, and incidental impurities.

* * * * *